United States Patent [19]

McLeod

[11] Patent Number: 4,908,515
[45] Date of Patent: Mar. 13, 1990

[54] METHOD OF EFFICIENTLY STORING SPENT NUCLEAR FUEL RODS IN A CYLINDRICAL CONTAINER

[75] Inventor: N. Barrie McLeod, Bethesda, Md.

[73] Assignee: NUS Corporation, Gaithersburg, Md.

[21] Appl. No.: 131,484

[22] Filed: Dec. 10, 1987

Related U.S. Application Data

[63] Continuation of Ser. No. 813,901, Dec. 27, 1985.

[51] Int. Cl.⁴ .................................... G21F 9/36
[52] U.S. Cl. ................... 250/507.1; 376/272; 252/633
[58] Field of Search ............... 206/499, 504, 443; 220/1.5; 53/443, 444, 446, 447, 475; 250/506, 507, 506.1, 507.1; 376/273, 272; 252/633

[56] References Cited

U.S. PATENT DOCUMENTS

| | | | |
|---|---|---|---|
| 3,262,859 | 7/1966 | Winsche | 250/499 |
| 3,731,101 | 5/1973 | Peterson et al. | 250/108 R |
| 3,859,533 | 1/1975 | Suvanto | 250/507 |
| 4,042,828 | 8/1977 | Rubinstein et al. | 250/507 |
| 4,063,999 | 12/1977 | Wade | 176/28 |
| 4,171,002 | 10/1979 | Smith | 134/166 R |
| 4,242,178 | 12/1980 | Batjukov et al. | 176/30 |
| 4,366,115 | 12/1982 | Schlumpf | 376/272 |
| 4,399,366 | 8/1983 | Bucholz | 250/507.1 |
| 4,447,729 | 5/1984 | Doroszlai et al. | 250/506.1 |
| 4,543,488 | 9/1985 | Diem | 250/507.1 |

FOREIGN PATENT DOCUMENTS

| | | | |
|---|---|---|---|
| 0171773 | 2/1986 | European Pat. Off. | 250/506.1 |
| 2828138 | 1/1980 | Fed. Rep. of Germany | 250/506.1 |
| 2368123 | 5/1978 | France | 250/506.1 |

Primary Examiner—Jack I. Berman
Attorney, Agent, or Firm—Sughrue, Mion, Zinn, Macpeak & Seas

[57] ABSTRACT

The spent fuel rods from a fuel assembly having the cross section of a square are consolidated in first cans having the same cross section and in second cans having the cross section of rectangle equal to one half of the square. The first and second cans are inserted in a cylindrical shipping or storage cask having the cross section of a circle, the number and portion of each of the first and second cans being selected to produce the maximum geometric or occupancy efficiency of equivalent squares circumscribable by the circle.

21 Claims, 2 Drawing Sheets

PWR

FIG.1A
PWR
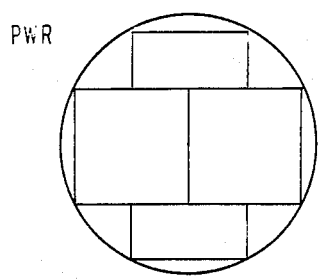
FIG.1B PRIOR ART
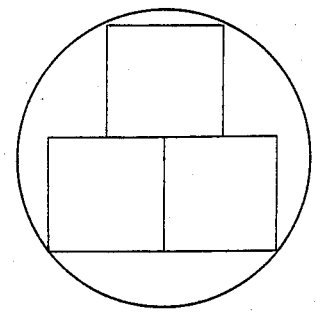
FIG.2A
BWR
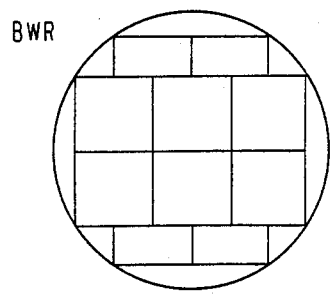
FIG.2B PRIOR ART
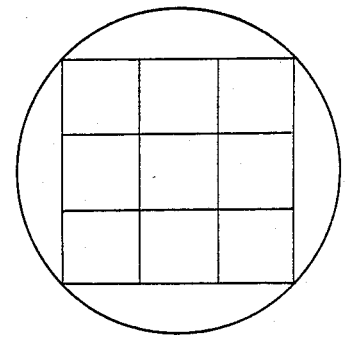
FIG.3
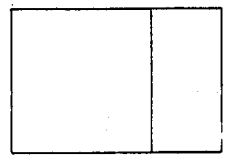
FIG.4
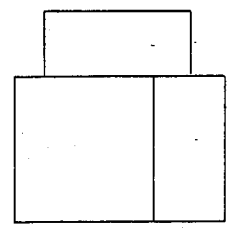
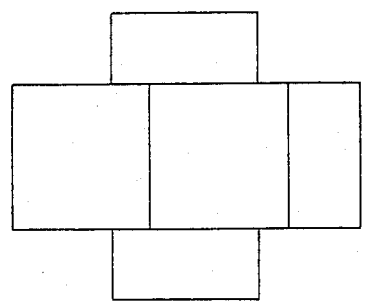
FIG.5

METHOD OF EFFICIENTLY STORING SPENT NUCLEAR FUEL RODS IN A CYLINDRICAL CONTAINER

This is a continuation of application Ser. No. 813,901 filed Dec. 27, 1985.

BACKGROUND OF THE INVENTION

1. Field of the Invention

My invention generally relates to the field of the handling and consolidation of spent nuclear fuel rods and, more particularly, to a method of improving the geometric utilization of the interior of a cylindrical container for the storing, shipping and/or disposing of such spent nuclear fuel rods.

2. Description of the Prior Art

Presently, nuclear fuel assemblies, of square cross section and containing spent nuclear fuel rods, are placed in fuel racks which are stored under water in storage pools. When a pool reaches its storage capacity, or at any other desired time, the individual spent fuel rods are removed from a fuel assembly and re-inserted and consolidated in long cans which have the same square cross section as one original fuel assembly. Each square can normally contains the fuel rods from two of the original spent fuel assemblies from either a pressurized water reactor (PWR) or a boiling water reactor (BWR).

Once the spent fuel is finally removed from the fuel storage pool for possible on-site storage, transport off-site, possible interim storage and retransport, and ultimate delivery to a repository or a reprocessing plant, the square cans of consolidated fuel rods are placed in (shielded) casks or other containers which have a cylindrical geometry and a circular cross section (see FIGS. 1B and 2B). Since these square cans have the same cross sectional area and dimensions as the original fuel assemblies which they replaced in the fuel racks in the storage pool, these square cans will normally not fit very efficiently in the containers or casks which are of circular cross section (see FIGS. 1B and 2B). Thus, there exists the problem of trying to improve the geometric efficiency with which square cans of consolidated fuel rods fill the containers of cylindrical volume and circular cross section.

The following U.S. patents may be relevant prior art with respect to my invention: Nos. 3,731,101; 3,859,533; 4,042,828; 4,063,999; 4,171,002; 4,242,178; 4,366,115; 4,399,366; and 4,447,729.

Pat. No. 3,731,101 discloses a solution to a related problem, whereby there is provided a (shielded) "cask" having three curved walls to produce a (shielded) cask having a generally rounded triangular cross section, the result being a (shielded) shipping container having a maximum capacity for spent fuel elements while having a minimum amount of weight. The shipping container shown in FIG. 3 has an inner shell defining a fuel element cavity with a cross-sectional configuration bounded by the three curved walls. The fuel elements are separated by spacers.

Pat. No. 4,063,999 achieves vertical staggering of active fuel sections by spacer plates as seen in FIG. 6.

Pat. No. 4,242,178 discloses an unshielded storage drum for the temporary storage of bent spent fuel rods.

Pat. Nos. 4,171,002 and 4,399,366 disclose shielded cylindrical shipping containers (a transport "flask" and a shipping "cask", respectively) for radioactive material and having square shaped compartments for holding spent fuel rods; however, neither of these patents addresses the question of geometrically improving the occupancy efficiency of a cylindrical container for spent fuel rods. The remaining patents are of background interest.

Pat. No. 4,447,729 discloses a shielded cylindrical container for the transportation of irradiated reactor elements.

SUMMARY OF THE INVENTION

The general object of my invention is to solve the above-noted problem by providing a novel method of improving the occupancy efficiency of cans of consolidated spent fuel rods stored within a cylindrical container (shielded or unshielded) having a circular cross section, i.e. to improve the geometric utilization of the interior of a cylindrical cask or container for storing, shipping and/or disposing of consolidated spent nuclear fuel rods which were previously placed only in square containers having the same square cross section as the fuel assembly from which the rods were removed.

This object is obtained by a method whereby I choose the optimal combination of full-square cans and half-square cans for producing the maximum occupancy efficiency of the cylindrical container (See FIGS. 1A, 2A and 3–11). I define a full-square can as a can having a square cross section which in some applications is the same as that of the original fuel assembly stored in a fuel rack in a storage pool, where the length of a side of the square is 1. I define a half-square can as a can of rectangular cross section whose long side has a length of 1 and whose short side has a length of $\frac{1}{2}$ (see FIGS. 1A, 2A, and 3–11).

My method is essentially a trial-and-error process which assumes that I begin with a cylindrical container whose cross section is a circle with a given diameter. As a first step, I insert a single half-square can within the circle. In the second step, an additional half-square can is added, and by rearranging as necessary, I establish the most compact or geometrically efficient array of half-square cans which will fit within the circle. For the third step, I repeat the second step for up to forty-eight more times to establish a fifty-member family of most-compact or most-efficient arrays containing from one to fifty half-square cans. In the fourth step, I review each member of the family, and, whenever two half-square cans would be side-by-side such that they can be replaced by a full-square can, I make this replacement in order to realize the economic savings of using a single full-square can as compared to the more expensive two half-square cans. For a fifth step, I review each sub-member from the fourth step, and any sub-member which does not contain a half-square can is excluded. Thus, my invention covers every member resulting from this process through the third step and every sub-member from the fourth step that is not excluded in the fifth step.

BRIEF DESCRIPTION OF THE DRAWING

FIGS. 1A and 1B schematically illustrate, in the form of predetermined arrays, the difference in geometric efficiencies between the prior art method of utilizing only full-square cans and the invention utilizing the optimum combination of half-square and full-square cans, for storing the spent fuel rods from six original spent fuel assemblies from a PWR.

FIGS. 2A and B schematically illustrate, in the form of predetermined arrays the difference in geometric efficiencies between the prior art method of using only full-square cans containing the fuel rods from 18 original fuel rod assemblies and the method of the invention utilizing an optimum combination of half-square and full-square cans for the fuel rods from 16 original fuel assemblies from a BWR.

FIGS. 3-11 schematically illustrate, in the form of predetermined arrays, the improved geometric efficiencies obtained by the method of this invention for the optimum combinatin of half-square and full-square cans corresponding to the storage capacities of 1½, 2, 3, 3½, 6, 8, 10, 11, 13 and 15 full-square cans, respectively.

DETAILED DESCRIPTION OF THE PREFERRED EMBODIMENTS

The geometric efficiency of a particular cylindrical container containing an array of half-square and full-square cans is defined as:

$$\text{Geometric Efficiency} = \frac{\text{Area occupied by array}}{\text{Internal area of cylinder}}$$

$$= \frac{nl^2}{(\pi/4)d^2}$$

$$= \frac{4n}{\pi(d/l)^2}$$

where:

$n$ = number of squares
  = one-half the number of consolidated original assemblies $l$ = outer side dimension of a full-square containing rods from two original assemblies
$d$ = inner diameter of cylindrical container Thus, the principal parameters needed to practice my invention are the number n of squares and the ratio d/l.

As shown in FIG. 1A, and using my optimum combination of two half-square and two full-square cans, where n=3 and $d^2/l^2$=5, I obtain a geometric efficiency of 0.764. By contrast, for the prior art configuration in FIG. 1B using only full-square cans, one obtains a geometric efficiency of only 0.575, again where n=3, but $d^2/l^2$=425/64.

Similarly, as shown in FIG. 2A, the method of my invention provides a geometric efficiency of 0.784 where n=8 and $d^2/l^2$=13, whereas the prior art method shown in FIG. 2B produces a geometric efficiency of only 0.637 where n=9 and $d^2/l^2$=18.

In each case, a full-square can is defined as having a square cross section which, in reactor applications, is the same as that of the original spent fuel rod assembly from which the individual fuel rods have been removed.

Even though configurations other than half-square and full-square cans may provide greater geometric efficiencies in a few arrays, the advantage of my invention is that the various arrays of half-full-square cans provide the best combination of efficiency and coverage over the whole range of array sizes.

Figure 6:
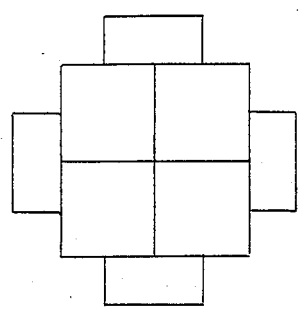
Figure 7:
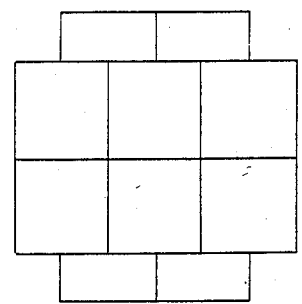
Figure 8:
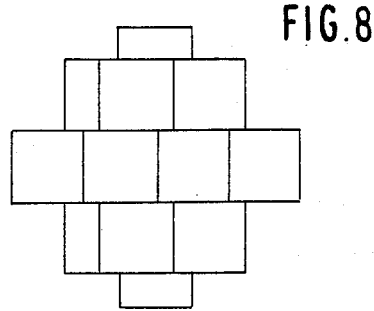
Figure 9:
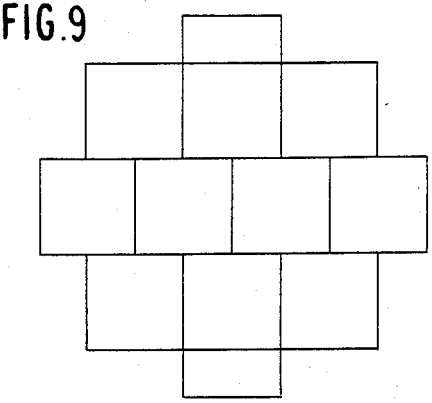
Figure 10:
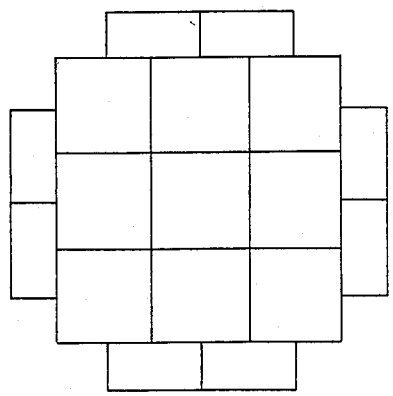
Figure 11:
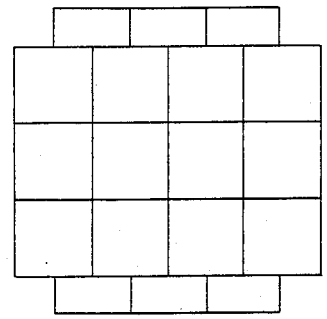

The following table lists the geometric efficiencies for the additional embodiments of my invention as illustrated, in the form of predetermined arrays, in FIGS. 3-11, respectively, with the efficiency listed for "half-square" being my invention, and with the efficiency listed as "full-square" being that of the prior art using only full-square cans.

| FIG. | 3 | 4 | 5 | 6 | 7 | 8 | 9 | 10 | 11 |
|---|---|---|---|---|---|---|---|---|---|
| Geom. Eff. (Half-Square) | .588 | .650 | .615 | .764 | .784 | .750 | .778 | .828 | .764 |
| Geom. Eff. (Full-Square) | — | .509 | — | .588 | .650 | .707 | .599 | .652 | .666 |

Thus, my invention provides an extremely cost-effective method of achieving the highest possible geometric efficiency from rectilinear fuel-storage cans in containers having circular geometries, and without incurring the relatively significant cost that would be incurred in attempting to reconfigure the circular geometries of present cylindrical containers. In the general process of consolidating spent fuel rods at reactors, perhaps up to two-thirds of the fuel assemblies can be consolidated in the conventional manner into full-square cans, each containing the spent fuel rods from two fuel assemblies. The remaining one-third of the fuel rods is consolidated into half-square cans each containing the rods from one fuel assembly. With my invention, two half-square cans fit together into a spent fuel rod rack location previously occupied by one whole original fuel assembly or one full-square can, and are, therefore, intact compatible with the square geometry of the in-pool fuel rod storage racks.

When fuel rods are consolidated at facilities, other than reactors, the dimensions of the can are not necessarily related to the original fuel assemblies. Again, only an appropriate fraction of the fuel would be consolidated into the half-square cans. For example, a somewhat different situation could arise at government storage facilities if spent fuel is to be consolidated to provide more compact interim storage in large storage casks. Ultimately, the spent fuel will be inserted into cylindrical disposal packages for final disposal in a nuclear waste repository, but, because the repository has not yet been designed, the disposal package diameter is not known at the time that consolidation must take place. If the spent fuel is consolidated into a mixture of square and half-square cans, efficient interim storage can be accomplished. Later when the repository has been opened, the square and half-square cans can be removed from storage and reconfigured to fit into the appropriate cylindrical package for final disposal. Because there is an efficient array available to fit almost any size of cylinder, the original consolidation of fuel into square and half-square cans assures that an efficient packing of the ultimate disposal package will ultimately be assured, regardless of the package size ultimately chosen. Thus, in this particular situation, if the original consolidation does not take place at a reactor, the size of square canister does not necessarily have to be related to the size of the original fuel assembly. The benefits of my invention arise when the fuel is loaded into the circular geometry of a storage cask, a shipping cask or the final disposal package whether shielded or unshielded.

In summary, then, FIGS. 1B and 2B illustrate the manner in which the prior art arrays (using only full-square cans) can be predetermined, while FIGS. 1A, 2A and 3–11 illustrate the manner in which my novel arrays (using optimal combinations of both full-square and half-square cans) can be predetermined.

While preferred embodiments of the invention have been described in the foregoing specification and illustrated in the attached drawing, it is to be understood that obvious variations of these preferred embodiments will become apparent to those of ordinary skill in the art and that the scope of the invention is limited only by the following claims.

I claim:

1. A method of improving the geometric efficiency of spent nuclear fuel rods stored in a cylindrical container having the cross section of a circle, said method comprising the steps of:
   a. removing spent fuel rods stored in a plurality of fuel assemblies each having the cross section of a square whose side-length is l;
   b. providing full-square storage cans having the cross section of a square with a side-length l, and inserting in each of said cans all of the removed fuel rods from two of said fuel assemblies;
   c. providing half-square storage cans having the cross section of a rectangle with side-lengths l and l/2, respectively, and inserting in each of said half-square storage cans all of the removed fuel rods from one of said fuel assemblies;
   d. predetermining the optimal combination of said full-square and half-square storage cans which maximizes the number of full-square and half-square storage cans capable of being circumscribed by said circle and which also contains the maximum number of full-square cans; and
   e. inserting into said circle, forming said cross section of said container, full-square and half-square cans in accordance with said predetermined combination, thereby producing a maximum can-occupancy of said container with the maximum number of said full-square cans.

2. The method of claim 1 wherein the number of half-square cans is 1 and the number of full-square cans is 1.

3. The method of claim 1 wherein the number of half-square cans is 2 and the number of full-square cans is 2.

4. The method of claim 1 wherein the number of half-square cans is 3 and the number of full-square cans is 2.

5. The method of claim 1 wherein the number of half-square cans is 4 and the number of full-square cans is 6.

6. The method of claim 1 wherein the number of half-square cans is 4 and the number of full-square cans is 8.

7. The method of claim 1 wherein the number of half-square cans is 2 and the number of full-square cans is 10.

8. The method of claim 1 wherein the number of half-square cans is 8 and the number of full-square cans is 9.

9. The method of claim 1 wherein the number of half-square cans is 6 and the number of full-square cans is 12.

10. The method of claim 1 wherein the number of half-square cans is 4 and the number of full-square cans is 4.

11. The method of claim 1 wherein the number of full-square cans is 1 and the number of half-square cans is 3, 2 or 1.

12. The method of claim 1 wherein the number of full-square cans is 2 and the number of half-square cans is 3, 2 or 1.

13. The method of claim 1 wherein the number of full-square cans is 4 and the number of half-square cans is 4, 3, 2 or 1.

14. The method of claim 1 wherein the number of full-square cans is 6 and the number of half-square cans is 4, 3, 2 or 1.

15. The method of claim 1 wherein the number of full-square cans is 8 and the number of half-square, cans is 4, 3, 2 or 1.

16. The method of claim 1 wherein the number of full-square cans is 9 and the number of full-square cans is 8, 7, 6 or 5.

17. The method of claim 1 wherein the number of full-square cans is 10 and the number of half-square cans is 2 or 1.

18. The method of claim 1 wherein the number of full-square cans is 12 and the number of half-square cans is 6, 5, 4 or 3.

19. The method of claim 1 wherein, prior to step a, the fuel assemblies are stored in receptacles of said square cross section in fuel racks in a pool of water; and further comprising: before step e, placing both said full-square storage cans and also abutting pairs of said half-square storage cans in respective ones of said receptacles, and, subsequently, removing full-square and half-square storage cans from said fuel racks at the time the spent fuel rods are to be stored in said cylindrical container.

20. The method of claim 1 wherein said predetermining step comprises drawing said circle on a flat surface, and drawing in the drawn circle the maximum number of full-squares and half-squares, respectively corresponding to said full-square and half-square cans, which produces said optimal combination.

21. A method of improving the geometric efficiency of spent nuclear fuel rods stored in a cylindrical container having the cross section of a circle, said method comprising the steps of:
   a. removing spent fuel rods stored in a plurality of fuel assemblies each having the cross section of a square whose side-length is l;
   b. providing full-square storage cans having the cross section of a square with a side-length l, and inserting in each of said cans all of the removed fuel rods from two of said fuel assemblies;
   c. providing half-square storage cans having the cross section of a rectangle with side-lengths l and l/B 2, resepctively, and inserting in each of said half-square storage cans all of the removed fuel rods from one of said fuel assemblies;
   d. inserting a first half-square can into said circle forming said cross section of said container; and
   e. inserting additional half-square cans into said circle and re-arranging all the inserted half-square cans after the insertion of each half-square can until there is inserted the maximum number of half square cans which can be circumscribed by said circle; and
   f. whenever two half-square cans are side-by-side such that they correspond to a full-square can, replacing the side-by-side half-square cans with a single full-square can.

* * * * *

UNITED STATES PATENT AND TRADEMARK OFFICE
CERTIFICATE OF CORRECTION

PATENT NO.   :   4,908,515
DATED        :   March 13, 1990
INVENTOR(S)  :   N. Barrie McLeod It is certified that error appears in the above-identified patent and that said Letters Patent is hereby corrected as shown below:

Column 1, line 29, after "(BWR).", insert --Thus, the storage capacity can be doubled in each storage location in the spent fuel rack containing the consolidated fuel rods.--

Column 6, line 52, delete "1/B2", and insert --$\ell/2$--.

Signed and Sealed this

Twentieth Day of August, 1991

Attest:

HARRY F. MANBECK, JR.

*Attesting Officer*    Commissioner of Patents and Trademarks